United States Patent
Smith, Jr. et al.

(10) Patent No.: US 11,466,201 B2
(45) Date of Patent: Oct. 11, 2022

(54) RENEWABLE RESOURCE AND WASTE MATERIAL DERIVATIVES FOR OIL AND GAS RECOVERY

(71) Applicant: Falcon Fabrication & Formulation, LLC, Braselton, GA (US)

(72) Inventors: Dennis W. Smith, Jr., Winder, GA (US); Babloo Sharma, Fayetteville, AR (US)

(*) Notice: Subject to any disclaimer, the term of this patent is extended or adjusted under 35 U.S.C. 154(b) by 8 days.

(21) Appl. No.: 16/450,917

(22) Filed: Jun. 24, 2019

(65) Prior Publication Data
US 2020/0115624 A1  Apr. 16, 2020

Related U.S. Application Data

(63) Continuation of application No. 15/084,389, filed on Mar. 29, 2016, now abandoned.

(60) Provisional application No. 62/140,047, filed on Mar. 30, 2015.

(51) Int. Cl.
| | | |
|---|---|---|
| *C09K 8/80* | (2006.01) | |
| *E21B 43/267* | (2006.01) | |
| *C09K 8/70* | (2006.01) | |
| *C09K 8/92* | (2006.01) | |

(52) U.S. Cl.
CPC ............... *C09K 8/80* (2013.01); *C09K 8/70* (2013.01); *C09K 8/805* (2013.01); *C09K 8/92* (2013.01); *E21B 43/267* (2013.01)

(58) Field of Classification Search
CPC . C09K 8/70; C09K 8/80; C09K 8/805; C09K 8/92; E21B 43/267
See application file for complete search history.

(56) References Cited

U.S. PATENT DOCUMENTS

| | | | | |
|---|---|---|---|---|
| 6,330,916 B1 * | 12/2001 | Rickards | ............... | C09K 8/685 |
| | | | | 166/280.2 |
| 2005/0277554 A1 * | 12/2005 | Blauch | ................ | C09K 8/5083 |
| | | | | 507/224 |
| 2009/0084287 A1 * | 4/2009 | Partanen | .................. | C10C 3/00 |
| | | | | 106/273.1 |
| 2012/0059084 A1 * | 3/2012 | Brown | ..................... | C08J 3/226 |
| | | | | 523/300 |
| 2013/0244912 A1 * | 9/2013 | Hughes | .................... | C09K 8/92 |
| | | | | 507/202 |
| 2014/0144631 A1 * | 5/2014 | Weaver | ................ | C09K 8/805 |
| | | | | 166/280.2 |

\* cited by examiner

*Primary Examiner* — Alicia Bland

(74) *Attorney, Agent, or Firm* — Law Office of John K. Pike, PLLC

(57) ABSTRACT

A composition for hydraulic fracking is provided, which includes a proppant particle and a ground rubber tire particle.

11 Claims, No Drawings

RENEWABLE RESOURCE AND WASTE MATERIAL DERIVATIVES FOR OIL AND GAS RECOVERY

CROSS-REFERENCE TO RELATED APPLICATIONS

This application claims the benefit of U.S. Application 62/140,047, filed Mar. 30, 2015, the entire contents of which are incorporated herein by reference.

FIELD OF THE INVENTION

The present invention relates to compositions and methods useful in the hydraulic fracturing industries. In particular, the present invention relates to compositions and methods useful for hydraulic fracturing in the oil and gas industry.

BACKGROUND

Hydraulic fracturing or "Tracking" is used to increase the rate at which fluids, such as petroleum, water, or natural gas can be recovered from subterranean natural reservoirs. Proppants are compression-resisting particles, which are used in the oil and gas industry to "prop" open fractures in a subterranean reservoir and facilitate the extraction or introduction of fluid out or into the formation. In the oil and gas industry, the fracking process creates cracks in the deep-rock formations through which natural gas, petroleum, and brine will flow more freely. One example of a subterranean reservoir matrix is a shale oil/gas layer, which are prevalent around the world and known in the oil and gas art. A fracking fluid is pumped down into well casings to build up a well bore pressure. When the applied well bore or hydraulic pressure is large enough to overcome the compressive strength, the shale layers fracture. Continued forceful injection of the fracking fluid increases the length and width of these fractures deep in shale layers. When the hydraulic pressure is removed from the well, small grains of hydraulic fracturing proppants hold the fractures open. Traditionally, so-called "frac sand" has been used to keep the fractured fissures open after the pressure drops. Frac sand inheres several disadvantages, however, which limit its use as a proppant. Examples of such disadvantages include fast settling, non-compliance with fines formation, and embedment in fractured walls.

Embedment of the proppants into the reservoir matrix under the action of closing stress undesirably decreases proppant conductivity. Another significant source of low conductivity of the proppants is the formation of crushed particles, or "fines" from the proppants and/or the reservoir matrix under stress. Closure stresses compress the proppants together and against the matrix walls, which results in proppant crushing and the production of more fines. Forces used during fracturing also generate fines from the formation material itself. Overall, and undesirably, the fines are displaced into the proppant pack leading a decrease in conductivity.

To mitigate the problems associated with frac sand, resin-coated proppants (RCPs) have been used as alternative proppants. Compared to frac sand, the RCPs maintain better fracture width over time, have better conductivity, and overall offer superior performance. The RCP coating deforms to collectively redistribute closure stress forces across a greater area, which exerts a greater resistance to crushing and fines formations. The RCP coatings also confine the fines, which further improve the conductivity of the proppant pack. Common proppant core particles used in RCPs include frac sand, glass, bauxite and ceramics, and their size ranges from about 4 to 200 mesh. Common resins used for proppant applications are mainly phenol-formaldehyde, epoxy, polyurethane and polyolefins.

U.S. Pat. Nos. 6,059,034 and 6,330,916 disclose proppant packs containing deformable additives. In U.S. Pat. No. 6,059,034 A, the deformable coatings and beads derived from polystyrene, divinyl benzene, and acrylate resins. These coatings and beads act as a cushion and minimize the closure stress on the proppants and thus reduce the fines formation. These deformable particles are claimed to minimize proppant flowback and improve fracture conductivity.

Another approach to increase proppant conductivity is to use an organic resin coating. In U.S. Pat. No. 3,929,191, a fusible thermoplastic (phenol-formaldehyde) resin is used to coat the beads or sand particles. This phenolic resin, injected into geological formations, crosslinks in situ, and agglomeration of the proppants occur. A small amount of aminoalkylalkoxysilane is used as a coupling agent to increase the adherence between phenolic resin to sand particles. However, under severe subterranean conditions, the phenolic resin continues to crosslink, which renders the coatings brittle and which further complicates the fines formation problem.

U.S. Pat. No. 7,322,411 describes the formation of deformable proppants by coating a deformable polymer over the sand or bead particles. Phenol-formaldehyde resins, melamine/formaldehyde resins, and polyurethane resins are the preferred polymers used to make deformable coatings. As discussed above, the phenolic resins have limitation due to continuous cross-linking resulting in coating brittleness. Polyester-polyol based polyurethane resins are hydrolysis susceptible and tend to be expensive, and thus limit their use.

In addition to the problems mentioned above, proppant resins such as phenol-formaldehyde, epoxy, polyurethane, and polyolefins and their degradation products present environmental hazards, which are exacerbated by the resins' lack of stability under harsh chemical and geophysical environments. Other disadvantages of these resins and their degradation products include embedment into fissure walls, flowback, and fast settling of proppants.

More than a billion tires are produced globally per annum. Discarded waste tires are estimated to be more than ten billion tires. An estimated 4,597 thousand tons of tires are generated in U.S. alone. Waste tires cause environmental, health and safety hazards. Rainwater accumulates in discarded tire piles, providing an ideal breeding environment for mosquitoes, which can contribute to the spread of disease, e.g., West Nile virus. Accumulated tire piles can burn for days causing the rubber to decompose into oil leading to ground and surface water pollution. For example, in 1996, a massive accidental tire fire cost millions of dollars in damage and affected commuters and businesses in the region over several months. The most devastating fire accident due to a tire fire occurred in 1983 at the Winchester, Va. tire storage factory. The fire burned for almost nine months causing an oil spill of 800,000 gallons and air pollution over a 50 mile area. Overall, discarded waste tires pose serious environmental, health and safety problems for neighboring communities. Hence, it becomes necessary to enhance reclaiming as well as recycling processes.

To reduce the waste tire problem and recover sometimes valuable materials, the tires are ground into particles.

Ground rubber tire, or "GRT" accounts for 17% of scrap tire consumption. The whole tire is shredded into useful particles with variable sizes.

Due to the recent interest and use of fracking technology, extraction of shale oil and gas, and the like, the proppant industry is at a nascent stage of development. According to a new technical market research report prepared by Dr. Gordon Nangmenyi for BCC Research, the U.S. market for fracking fluids was valued at US $18.4 billion in 2012 and $26 billion for 2013. BCC Research projects the market to grow to nearly $37.3 billion by 2018, and register a five-year compound annual growth rate of 7.4% from 2013 to 2018.

It is desirable to formulate a novel and affordable hydraulinc fracturing composition which can address the aforementioned performance issues. Numerous competing approaches exist without a clear cut winner that satisfactorily fulfills all the requirements.

This background information is provided for informational purposes only. No admission is necessarily intended, nor should it be construed, that any of the preceding information constitutes prior art against the present invention.

SUMMARY

The aforementioned problems, and others, are solved by various embodiments of the present subject matter.

In some embodiments, a composition for hydraulic fracking comprises a proppant particle and a ground rubber tire particle.

In some embodiments, a method of treating a subterranean formation comprises injecting a composition comprising a proppant particle and a ground rubber tire particle into the subterranean formation.

In some embodiments, a method of extracting or injecting a product or feed from or into a subterranean formation comprises injecting a composition comprising a proppant particle and a ground rubber tire particle into the subterranean formation and thereafter extracting a product from the subterranean formation, injecting a feed into the subterranean formation, or a combination thereof.

In some embodiments, a composition for hydraulic fracking comprises a ground rubber tire particle and a fracking fluid.

In some embodiments, a method of treating a subterranean formation comprises injecting a composition comprising a ground rubber tire particle and a fracking fluid into the subterranean formation.

In some embodiments, a method of extracting or injecting a product or feed from or into a subterranean formation comprises a composition comprising a ground rubber tire particle and a fracking fluid into the subterranean formation, and thereafter, extracting a product from the subterranean formation, injecting a feed into the subterranean formation, or a combination thereof.

In some embodiments, a method of treating a subterranean formation comprises injecting a composition comprising a ground rubber tire particle into the subterranean formation.

In some embodiments, a method of extracting or injecting a product or feed from or into a subterranean formation comprises injecting a composition comprising a ground rubber tire particle into the subterranean formation and thereafter extracting a product from the subterranean formation, injecting a feed into the subterranean formation, or a combination thereof.

In some embodiments, a method for making a hydraulic fracking composition comprises contacting a ground rubber tire particle and one or more of a proppant particle, a fracking fluid, or combination thereof.

It is to be understood that both the foregoing general description of the embodiments and the following detailed description are exemplary, and thus do not restrict the scope of the embodiments.

DETAILED DESCRIPTION

Reference will now be made in detail to embodiments of the invention which serve to explain the principles of the invention. These embodiments describe in sufficient detail to enable those skilled in the art to practice the invention, and it is understood that other embodiments may be utilized, and that structural, engineering, and chemical changes may be made without departing from the spirit and scope of the present invention. Unless defined otherwise, all technical and scientific terms used herein have the same meanings as commonly understood by one of ordinary skill in the art.

As used herein, the recited terms have the following meanings. All other terms and phrases used in this specification have their ordinary meanings as one of skill in the art would understand. Such ordinary meanings may be obtained by reference to technical dictionaries, reference texts, and the like such as *Hawley's Condensed Chemical Dictionary* $14^{th}$ Edition, by R. J. Lewis, John Wiley & Sons, New York, N.Y., 2001 and *Principles of Polymerization* $4^{th}$ Edition, by George Odian, Wiley-Interscience (2004).

For the purpose of interpreting this specification, the following definitions will apply and whenever appropriate, terms used in the singular will also include the plural and vice versa. In the event that any definition set forth below conflicts with the usage of that word in any other document, including any document incorporated herein by reference, the definition set forth below shall always control for purposes of interpreting this specification and its associated claims unless a contrary meaning is clearly intended (for example in the document where the term is originally used). The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. Furthermore, where the description of one or more embodiments uses the term "comprising," those skilled in the art would understand that, in some specific instances, the embodiment or embodiments can be alternatively described using the language "consisting essentially of" and/or "consisting of." As used herein, the term "about" means at most plus or minus 10% of the numerical value of the number with which it is being used. As used herein, the terms "Tracking", "fracturing", and "hydraulic fracturing" are used interchangeably.

The present application provides to a burgeoning market a renewable, inexpensive, non-toxic, abundant and environmentally friendly resource. In some embodiments, the combined properties of unsaturated hydrocarbon polymers intermittent with high grade carbon microparticles ensure high toughness, superior mechanical and chemical qualities and scope for post-curing modifications. Ground rubber tire ("GRT") is a global waste product and now can be a viable solution to global energy demands.

The inventors have found that compositions and/or coatings containing GRT particles can provide control over thermal degradability and a potential RCP enhancement in recovery of oil/gas field value. In some embodiments, the compositions, e.g., GRT/proppant, GRT-RCP derived coatings, and the like are stable at temperatures for current commercial applications. In some embodiments, the degradation products are not an environmentally or otherwise health threat.

Tires are made of vulcanized (i.e. cross-linked polymer chains) rubber and various reinforcing materials. The most commonly used rubber matrix is the co-polymer styrene-butadiene (SBR) or a blend of natural rubber and SBR. In addition to the rubber compound, tires contain reinforcing fillers such as carbon black, used to strengthen the rubber and aid abrasion resistance; reinforcing fibers such as textile or steel fibers, usually in the form of a cord, used to provide the reinforcing strength or tensile component in tires, and/or other reinforcing fibers such as cotton, rayon, nylon and polyester; extenders such as petroleum oils, used to control viscosity, reduce internal friction during processing, and improve low temperature flexibility in the vulcanized product, and/or other extenders such as naphthenic oil and aromatic oil; vulcanizing agents such as organo-sulfur compounds, used as the catalyst for the vulcanization process; and zinc oxide and stearic acid, used to activate curing and to preserve cured properties. Typically, a tire contains about 70% recoverable rubber, 15% steel, 3% fiber, and 12% extraneous material, but other compositions are possible. Of the recoverable rubber, tires typically contain about 65% natural rubber and about 35% synthetic rubber, but other compositions are possible.

The ground rubber tire particles herein are not particularly limiting. Non-limiting examples of ground rubber tire particles include ground rubber, crumb rubber, ground crumb rubber, or combination thereof.

The method for making the ground rubber tire particles is not particularly limiting. Non-limiting examples include granulation, hammermilling, crackermilling, fine grinding, micromachining, cryogenic, turbo-milling, chemically modifying, mechanochemically modifying, or any combination thereof. The ground rubber tire particles may be unmodified, or they may be modified by or with one or more of plasma treatment, corona discharge, halogenation, high energy radiation, UV, ion and photoinduced grafting, chemical initiation, sulfuric acid, nitric acid, hydrogen peroxide, surface-chlorination, crosslinked coating, or a combination thereof. The ground rubber tire particles may have an unmodified surface, a modified surface, a surface modified via one or more grafting method such as silylation, halogenation, amination, sulfonation and/or epoxidation, or combination thereof. Combinations of different particles are contemplated.

The composition of the ground rubber tire particles is not particularly limiting. In some embodiments, the ground rubber tire particles may include one or more vulcanized (i.e. cross-linked polymer chains) rubber, co-polymer styrene-butadiene (SBR), natural rubber, synthetic rubber, reinforcing filler, carbon black, reinforcing fiber, textile fiber, steel fiber, cord, cotton, rayon, nylon, polyester, fiberglass, extender, petroleum oil, naphthenic oil, aromatic oil, vulcanizing agent, organo-sulfur compound, catalyst, metal oxide, zinc oxide, fatty acid, stearic acid, or combination thereof. In some embodiments, the ground rubber tire particles contain about 70% rubber, 15% steel, 3% fiber, and 12% extraneous material, but other compositions are possible. In some embodiments, the ground rubber tire particles contain about 65% natural rubber and about 35% synthetic rubber, but other compositions are possible. In some embodiments, the ground rubber tire particles include reprocessed rubber (NR-SBR; 40-45%), carbon black (27-33%), zinc oxide (0.2-0.3%), silica (0.2-0.3%), sulfur (1.5-2.5%), zinc stearate (1-2%), and process oil (10-20%). Commercial ground rubber tire particles may be used if desired. A non-limiting example of commercially available ground rubber tire particles include cryogenically ground mechanochemically devulcanized particles PolyDyne™ available from Lehigh Technologies (Atlanta, Ga.), but others are possible.

In some embodiments, the ground rubber tire particles are free of or substantially free of one or more of vulcanized (i.e. cross-linked polymer chains) rubber, co-polymer styrene-butadiene (SBR), natural rubber, synthetic rubber, reinforcing filler, carbon black, reinforcing fiber, textile fiber, steel fiber, cord, cotton, rayon, nylon, polyester, fiberglass, extender, petroleum oil, naphthenic oil, aromatic oil, vulcanizing agent, organo-sulfur compound, catalyst, metal oxide, zinc oxide, fatty acid, stearic acid, or combination thereof. In some embodiments, the ground rubber tire particles are free or substantially free of one or more of steel fiber and/or other fiber.

In some embodiments, the ground rubber tire particles are produced by ambient temperature grinding, cryogenic grinding, or a combination thereof. In some embodiments, the ground rubber tire particles are produced by cryogenic grinding.

In some embodiments, the ground rubber tire particles are produced by a cryogenically aided mechanochemical turbo-shearing mill process. An example of such a process is disclosed in S. B. Liang and Y. C. Hao, *Adv. Powder Technol.*, 11, 187 (2000), incorporated herein by reference.

In some embodiments, the ground rubber tire particles include those in which the surface is modified by bulk polymerization of acrylic acid without using any initiator, such as disclosed in "Surface Modified Ground Rubber Tire by Grafting Acrylic Acid" S. Kocevski et al., *Construction and Building Materials* 34 (2012) 83-90, incorporated herein by reference.

In some embodiments, the ground rubber tire particles include poly acrylic acid (PAA) grafted ground rubber tire particles (PAA-g-GRT) and PAA-g-GRT/epoxy composites thereof, such as disclosed in "Surface-Grafting of Ground Rubber Tire by Poly Acrylic acid via Self-Initiated Free Radical Polymerization and Composites with Epoxy Thereof" S. Yagneswaran et al., *Polymer Composites* (2013) 769-777; DOI 10.1002/pc, incorporated herein by reference.

In some embodiments, the ground rubber tire particles include epoxy/amine GRT composites such as disclosed in "Non-isothermal Curing Kinetics of Epoxy/Mechanochemical Devulcanized Ground Rubber Tire (GRT) Composites" S. Yagneswaran et al., *Polym. Bull.* (2013) 70:1337-1351; DOI 10.1007/s00289-013-0926-z, incorporated herein by reference. In some embodiments, the ground rubber tire particles are modified by diglycidyl ether of bisphenol A (DGEBA) epoxy resin (Trade name: Floropoxy 4805 part A) and polyoxyalkyleneamine curing agent (Trade name: Activator 4805 part B) available from FLOROCK, USA.

In some embodiments, the ground rubber tire particles include those described in U.S. Pat. No. 7,351,774, issued Apr. 1, 2008, incorporated herein by reference.

In some embodiments, the ground rubber tire particles include those described in "Ground Rubber Tire Based Polymer Composite Materials: Synthesis, Surface Modification, Characterization and Applications" S. Yagneswaran, Ph.D. Dissertation, December 2012, incorporated herein by reference.

In some embodiments, the ground rubber tire particles include epoxy/amine GRT composites in which the GRT particles are obtained by a cryogenically aided mechanochemical turbo-shearing mill process.

In some embodiments, the ground rubber tire particles may be surface-grafted with one or more vinyl monomers such as, for example, acrylic, diene, olefin, styrenic, unsaturated compound, or combination thereof via a grafting method such as, for example, silylation, halogenations, amination, sufonation, epoxidation, or combination thereof.

The size of the ground rubber tire particle is not particularly limiting. In some embodiments, the ground rubber tire particle may have a mesh size of 2 to 200 mesh. This range includes all values and subranges therebetween, including 2, 3, 4, 5, 6, 7, 8, 10, 12, 14, 16, 18, 20, 25, 30, 35, 40, 45, 50, 60, 70, 80, 100, 120, 140, 170, 200 mesh, or any combination thereof. In some embodiments, the ground rubber tire particle may have a size ranging from about 70 µm to about 7 mm. This range includes all values and subranges therebetween, including about 70, 75, 80, 90, 100, 105, 120, 125, 140, 150, 170, 180, 210, 250, 290, 300, 350, 355, 400, 500, 590, 595, 700, 710, 840, 845, 850, 900, 950 µm, 1, 1.5, 2, 2.5, 3, 3.5, 4, 4.5, 5, 5.5, 6.5, 7 mm, or any combination thereof.

If the ground rubber tire particle comprises a coating such as, for example, a resin coating, epoxy coating, or the like, the size of the resultant coated GRT particle is similarly not limiting. For example, in some embodiments, the size of the coated ground rubber tire particle or ground rubber tire composite particle may have a mesh size of 2 to 200 mesh. This range includes all values and subranges therebetween, including 2, 3, 4, 5, 6, 7, 8, 10, 12, 14, 16, 18, 20, 25, 30, 35, 40, 45, 50, 60, 70, 80, 100, 120, 140, 170, 200 mesh, or any combination thereof. In some embodiments, the coated ground rubber tire particle or ground rubber tire composite particle may have a size ranging from about 70 µm to about 7 mm. This range includes all values and subranges therebetween, including about 70, 75, 80, 90, 100, 105, 120, 125, 140, 150, 170, 180, 210, 250, 290, 300, 350, 355, 400, 500, 590, 595, 700, 710, 840, 845, 850, 900, 950 µm, 1, 1.5, 2, 2.5, 3, 3.5, 4, 4.5, 5, 5.5, 6.5, 7 mm, or any combination thereof.

The proppant particle is not particularly limiting. Non-limiting examples of proppant particles include non-deformable, deformable, inorganic, organic, coated, reactive, surface-modified, non-surface-modified, hollow, solid, porous, non-porous, or combination thereof.

The size of the proppant particle is not particularly limiting. In some embodiments, the proppant particle may have a mesh size of 2 to 200 mesh. This range includes all values and subranges therebetween, including 2, 3, 4, 5, 6, 7, 8, 10, 12, 14, 16, 18, 20, 25, 30, 35, 40, 45, 50, 60, 70, 80, 100, 120, 140, 170, 200 mesh, or any combination thereof. In some embodiments, the proppant particle may have a size ranging from about 70 µm to about 7 mm. This range includes all values and subranges therebetween, including about 70, 75, 80, 90, 100, 105, 120, 125, 140, 150, 170, 180, 210, 250, 290, 300, 350, 355, 400, 500, 590, 595, 700, 710, 840, 845, 850, 900, 950 µm, 1, 1.5, 2, 2.5, 3, 3.5, 4, 4.5, 5, 5.5, 6.5, 7 mm, or any combination thereof.

In some embodiments, the non-deformable proppant particles include, for example, one or more of silica (such as Ottawa, Brady or Colorado Sands), sand, gravel, glass, glass microspheres, glass beads, ceramics, alumina, aluminosilicates such as CARBOLITE™, NAPLITE™ or ECONOPROP™, resin-coated sand such as ACME BORDEN PR 6000™ or SANTROL TEMPERED HS™, bauxite, sintered bauxite, CRCS (Curable Resin Coated Sand), PRCS (Pre-Cured Resin Coated Sand), intermediate-strength proppant (ISP); lightweight proppant (LWP); semi-crystalline alumina; semi-crystalline alumina silicate; mullite; cordierite; sintered kaolinite; aluminate, aluminate, yttrium aluminate, titanium aluminate, lanthanum aluminate, barium aluminate; and mixtures thereof.

The crush strength of the proppant particle is not particularly limiting. In some embodiments, the proppant particle has a crush strength ranging from about 2,000 to about 50,000 psi. This range includes all values and subranges therebetween, including about 2,000, 2,500, 2,750, 3,000, 4,000, 5,000, 5,500, 6,000, 6,500, 7,000, 8,000, 9,000, 10,000, 12,000, 14,000, 15,000, 16,000, 18,000, 20,000, 25,000, 30,000, 35,000, 40,000, 45,000, 50,000 psi or any combination thereof.

If the proppant particle comprises a coating such as, for example, a resin coating, epoxy coating, or the like, the size of the resultant coated proppant particle is similarly not limiting. For example, in some embodiments, the size of the coated proppant particle or ground rubber tire composite particle may have a mesh size of 2 to 200 mesh. This range includes all values and subranges therebetween, including 2, 3, 4, 5, 6, 7, 8, 10, 12, 14, 16, 18, 20, 25, 30, 35, 40, 45, 50, 60, 70, 80, 100, 120, 140, 170, 200 mesh, or any combination thereof. In some embodiments, the coated proppant particle or ground rubber tire composite particle may have a size ranging from about 70 µm to about 7 mm. This range includes all values and subranges therebetween, including about 70, 75, 80, 90, 100, 105, 120, 125, 140, 150, 170, 180, 210, 250, 290, 300, 350, 355, 400, 500, 590, 595, 700, 710, 840, 845, 850, 900, 950 µm, 1, 1.5, 2, 2.5, 3, 3.5, 4, 4.5, 5, 5.5, 6.5, 7 mm, or any combination thereof.

Non-limiting examples of deformable proppants include polymeric, chipped, ground or crushed shells of nuts such as walnut, pecan, coconut, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, or combination thereof.

In some embodiments, the proppant particle includes one or more of lignin, chitosan, or cellulose particles.

Non-limiting examples of deformable polymeric proppants include substantially spherical or beaded proppants of copolymers, such as polystyrene divnylbenzene, terpolymers, such as polystyrene/vinyl/divinyl benzene and acrylate-based terpolymers, and polymers of furfuryl derivatives, phenol formaldehyde, phenolic epoxy resins, polystyrene, methyl methacrylate, nylon, polycarbonates, polyethylene, polypropylene, polyvinylchloride, polyacrylonitrile-butadiene-styrene, polyurethane and mixtures thereof.

If desired, one or more of the polymeric proppant particles may be reacted with a crosslinker, such as divinyl benzene.

In some embodiments, the proppants may be optionally strengthened or hardened with a protective coating or modifying agent which increases the ability of the material to resist deformation by strengthening or hardening the material (e.g., by increasing the elastic modulus of the naturally occurring material). The resulting proppant has increased resistance (e.g., partial or complete resistance) to deformation under in situ formation or downhole conditions as compared to those proppants that have not been so modified.

Non-limiting examples of modifying agents for the proppant particle include, for example, any compound or other material effective for modifying (e.g., crosslinking, coupling or otherwise reacting with) the proppant without degrading or otherwise damaging strength or hardness of the proppant, and/or without producing damaging by-products during modification that act to degrade or otherwise damage strength or hardness of the proppant (e.g., without liberating acids such as hydrochloric acid, organic acids, etc.). Non-limiting examples of modifying agents include compounds containing silicon-oxygen linkages, cyanate groups, epoxy groups, polyisocyanate-based compounds, silane-based compounds, siloxane-based compounds, epoxy-based, or combination thereof.

In some embodiments, the proppant may include one or more coatings for coating at least a portion of the aforementioned proppant particulates include at least one of phenol formaldehyde resin, melamine formaldehyde resin, urethane resin, or a mixture thereof. Other optional coating compositions known in the art to be useful as hardeners for such materials (e.g., coating materials that function or serve to increase the elastic modulus of the material) may be also employed in conjunction or as an alternative to protective coatings, and may be placed underneath or on top of one or more protective coatings. Such protective and/or hardening coatings may be used in any combination suitable for imparting desired characteristics to the proppant, including in two or more multiple layers. In this regard successive layers of protective coatings, successive layers of hardening coatings, alternating layers of hardening and protective coatings, etc. are possible. Mixtures of protective and hardening coating materials are possible.

The shape of any of the proppant and/or GRT particle is not particularly limited. Non-limiting examples of particle shapes include non-spherical, spherical, acicular, oval, egg-shaped, tear drop shaped, cubic, bar-shaped, polyhedral, hexahedral, cylindrical, multi-faceted, irregular, or mixtures thereof. The composition may include different types of particles all having substantially the same shape, same types of particles all having substantially the same shape, different types of particles independently having different respective shapes, same types of particles In addition, it will be understood with benefit of the present disclosure that beaded or non-beaded deformable particles may have a surface that is substantially roughened or irregular in nature or a surface that is substantially smooth in nature.

In some embodiments, the proppant can be spherical and have a Krumbein sphericity from about 0.3 to about 0.9 or greater. This range includes all values and subranges therebetween, including 0.3, 0.4, 0.5, 0.6, 0.7, 0.8, and 0.9 or greater.

The compositions described herein may be added to fracking fluid. The fracking fluid is not particularly limiting, and its composition may suitably vary depending on the type of fracturing used. Non-limiting examples of fracking fluids include water, brine, alcohol, isopropyl alcohol, 2-butoxy-ethanol, ethylene glycol, methanol, gel, foam, "slickwater-based fluid", liquefied petroleum gas (LPG), propane, acid, nitrogen gas, carbon dioxide, or combination thereof, as are known in the art.

In one embodiment, the fracking fluid includes one or more linear gels. Non-limiting examples of such gels include cellulose, carboxymethyl cellulose, hydroxyethyl cellulose, carboxymethyl hydroxyethyl cellulose, hydroxypropyl cellulose, hydroxyethyl methyl cellulose, guar, hydroxypropyl guar, carboxymethyl hydroxypropyl guar, or combination thereof.

In some embodiments, the fracking fluid includes one or more borate-crosslinked fluids. Non-limiting examples of such fluids include guar-based fluids cross-linked with boron ions, e.g., from aqueous borax/boric acid solution.

In some embodiments, the fracking fluid includes organometallic-crosslinked fluids such as, for example, one or more salts of zirconium, chromium, antimony, titanium, or combination thereof are crosslinked with one or more gels, such as guar-based gels.

In some embodiments, the fracking fluid includes one or more aluminium phosphate-ester oil gels.

In some embodiments, the fracking fluid includes one or more slickwater fluids.

In some embodiments, the fracking fluid may include water, particles, and optional additives.

The amounts of fluid and particles in the fracking fluid are not particularly limiting. In some embodiments, the composition is present in an amount of about 0.1 to about 30% by weight based on the total weight of the fracking fluid. This range includes all values and subranges therebetween, including 0.1, 0.2, 0.3, 0.4, 0.5, 0.6, 0.7, 0.8, 0.9, 1, 2, 3, 4, 5, 6, 7, 8, 10, 12, 14, 16, 18, 20, 25, and 30% or any combination thereof.

The composition, fracking fluid, or both may optionally contain one or more additives useful in hydraulic fracturing. Non-limiting examples of optional additives include ethylene glycol; 1,2,4-trimethylbenzene; 1,2-benzisothiazolin-3-one; 1,4-dioxane; 1-eicosene; 1-hexadecene; 1-octadecene; 1-tetradecene; 2,2 dibromo-3-nitrilopropionamide; 2,2'-azo-bis-(2-(imidazlin-2-yl)propane)-dihydrochloride; 2,2-dibromomalonamide; 2-acrylamido-2-methylpropane sulphonic acid sodium salt polymer; 2-acryloyloxyethyl(benzyl)dimethylammonium chloride; 2-bromo-2-nitro-1,3-propanediol; 2-butoxy ethanol; 2-dibromo-3-nitriloprionamide; 2-ethyl hexanol; 2-propanol; 2-propen-1-aminium, N,N-dimethyl-N-2-propenyl-chloride; 2-propenoic acid homopolymer/ammonium salt; 2-propenoic acid polymer with 2-propenamide/sodium salt; 2-propenoic acid polymer with sodium phosphinate; 2-propenoic acid telomer with sodium hydrogen sulfite; propargyl alcohol; 3-methyl-1-butyn-3-ol; 4-nonylphenol polyethylene glycol ether; acetic acid; acetic anhydride; acetone; acrylamide-sodium 2-acrylamido-2-methylpropane sulfonate copolymer; acrylamide-sodium acrylate copolymer or anionic polyacrylamide; acrylamide polymer with N,N,N-trimethyl-2[1-oxo-2-propenyl]oxy ethanaminium chloride; C12-C16 ethoxylated alcohol; aliphatic acids; aliphatic alcohol glycol ether; aliphatic hydrocarbon, hydrotreated light distillate, petroleum distillates, isoparaffinic solvent, paraffin solvent, napthenic solvent; alkenes; alkyl (C14-C16) olefin sulfonate, sodium salt; alkyl aryl polyethoxy ethanol; alkylaryl sulfonate; alkylphenol ethoxylate surfactants; aluminum chloride; amines, C12-14-tert-alkyl, ethoxylated; amines, ditallow alkyl, ethoxylated; amines, tallow alkyl, ethoxylated, acetates; ammonia; ammonium acetate; ammonium alcohol ether sulfate; ammonium bisulfate; ammonium bisulfate; ammonium chloride; ammonium citrate; ammonium cumene sulfonate; ammonium hydrogen-difluoride; ammonium nitrate; ammonium persulfate/diammonium peroxidisulphate; ammonium thiocyanate; aqueous ammonia; aromatic hydrocarbons; aromatic ketones; bentonite, benzyl(hydrogenated tallow alkyl) dimethylammonium stearate complex/organophilic clay; benzene; benzene, 1,1'-oxybis, tetratpropylene derivatives, sulfonated, sodium salts; N,N-dimethyl-N-[2-[(1-oxo-2-propenyl)oxy]ethyl]-benzenemethanaminium chloride, polymer with 2-propenamide; boric acid; boric oxide; boric anhydride; butan-1-ol; C10-C16 ethoxylated alcohol; C12-15 ethoxylated alcohol; calcium chloride; carbon dioxide; carboxymethylhydroxypropyl guar; cellulase/hemicellulase enzyme; cellulose; chlorine dioxide; citric acid; citrus terpenes; cocamidopropyl betaine; cocamidopropylamine oxide; coco-betaine; copper(ii) sulfate; CRISSANOL A-55; crystalline silica; cupric chloride dehydrate; d-limonene; sorbitol; decyl-dimethyl amine oxide; decyldimethyl amine; dibromoacetonitrile; diethylbenzene; diethylene glycol; diethylenetriamine penta methylenesulphonic acid sodium salt; diisopropyl naphthalenesulfonic acid; dimethylcocoamine, bis(chloroethyl) ether, diquaternary ammonium salt; dimethyldiallylammonium chloride; dipropylene glycol; disodium ethylene diamine tetraacetate; dodecylbenzene; dodecylbenzene sulfonic acid; dodecylbenzenesulfonate isopropanolamine; endo-1,4-beta-mannanase or hemicellulase; erucic amidopropyl dimethyl betaine; erythorbic acid; ethanaminium, N,N,N-trimethyl-2-[(1-oxo-2-propenyl)oxy]-, chloride, homopolymer; ethoxylated 4-tert-octylphenol; ethoxylated alcohol; ethoxylated alcohol; ethoxylated alcohol (C10-12); ethoxylated alcohol (C14-15); ethoxylated alcohol (C9-11); ethoxylated alcohols (C12-14); ethoxylated castor oil; ethoxylated fatty acid, coco; ethoxylated fatty acid, coco, reaction product with ethanolamine; ethoxylated hexanol; ethoxylated octylphenol; ethoxylated sorbitan mono stearate; ethoxylated sorbitan trioleate; ethyl alcohol; ethyl benzene; ethyl lactate; ethylene glycol-propylene glycol copolymer; ethylene oxide; ethyloctynol; fatty acids; tall oil fatty acid; fatty alcohol polyglycol ether surfactant ferric chloride; ferrous sulfate; formaldehyde; formaldehyde polymer with 4,1,1-dimethylethyl phenolmethyl oxirane; formamide; formic acid; fumaric acid; glassy calcium magnesium phosphate; glutaraldehyde; glycerol; guar gum; heavy aromatic petroleum naphtha; hemicellulase; hydrochloric acid; hydrogen peroxide; hydroxy acetic acid; hydroxyacetic acid ammonium salt; hydroxyethyl cellulose; hydroxylamine hydrochloride; hydroxypropyl guar; isomeric aromatic ammonium salt; isopropanol; isopropylbenzene; isoquinoline; kerosene; lactose; magnesium silicate hydrate; methanol; mineral spirits; monoethanolamine; N,N,N-trimethyl-2[1-oxo-2-propenyl]oxy ethanaminium chloride; N-benzyl-alkyl-pyridinium chloride; N-cocoamidopropyl-N,N-dimethyl-N-2-hydroxypropylsulfobetaine; naphtha; naphthalene naphthalene bis(1-methylethyl); 2-ethoxy-naphthalene; nitrogen; nonylphenol polyethoxylate; organophilic clays; oxyalkylated alkylphenol; petroleum distillate blend; petroleum naphtha; phosphonic acid; pine oil; poly(oxy-1,2-ethanediyl), α-[3,5-dimethyl-1-(2-methylpropyl)hexyl]-ω-hydroxy-; poly(oxy-1,2-ethanediyl), α-hydro-ω-hydroxy/polyethylene glycol; poly(oxy-1,2-ethanediyl), α-tridecyl-ω-hydroxy-; trimethylamine quaternized polyepichlorohydrin; polyethlene glycol oleate ester; polyethoxylated alkanol; polymer with 2-propenoic acid and sodium 2-propenoate; polymeric hydrocarbons; polyoxyethylene sorbitan monooleate; polyoxylated fatty amine salt; potassium acetate; potassium borate; potassium carbonate; potassium chloride; potassium formate; potassium hydroxide; potassium metaborate; potassium sorbate; precipitated silica; propylene glycol; propylene glycol monomethyl ether; quaternary ammonium compounds; quinoline; salt of amine-carbonyl condensate; salt of fatty acid/polyamine reaction product; sodium 1-octanesulfonate; sodium acetate; sodium alpha-olefin sulfonate; sodium benzoate; sodium bicarbonate; sodium bisulfate; sodium bromide; sodium carbonate; sodium chloride; sodium chlorite; sodium chloroacetate; sodium citrate; sodium erythorbate; sodium glycolate; sodium hydroxide; sodium hypochlorite; sodium metaborate.8h2o; sodium perborate tetrahydrate; sodium persulfate; sodium polyacrylate; sodium sulfate; sodium tetraborate decahydrate; sodium thiosulfate; sorbitan monooleate; sucrose; sugar; sulfamic acid; surfactant blend; amorphous silica; pyrogenic silica; tall oil fatty acid diethanolamine; tallow fatty acid sodium salt; terpene, terpenoid; tetrahydro-3,5-dimethyl-2H-1,3,5-thiadiazine-2-thione); tetrakis(hydroxymethyl)phosphonium sulfate; tetramethyl ammonium chloride; tetrasodium ethylenediaminetetraacetate; thioglycolic acid; thiourea; thiourea polymer with formaldehyde and 1-phenylethanone; toluene; tributyl tetradecyl phosphonium chloride; triethanolamine hydroxyacetate; triethylene glycol; ethoxylated trimethylolpropane; propoxylated trimethylolpropane; trisodium ethylenediaminetetraacetate; trisodium nitrilotriacetate; trisodium orthophosphate; urea; vinylidene chloride/methylacrylate copolymer; water; xylene; radiolabeled tracers; pH buffers; and any combination thereof.

Additives such as those described herein or others may be utilized for various purposes, e.g., cleaning the perforations and initiating fissure in the near-wellbore rock; delaying breakdown of gel polymer chains; decreasing turbulence in fluid flow and pipe friction; preventing formation of scale deposits in the pipe, maintaining fluid viscosity; maintaining effectiveness of crosslinkers; disinfecting the water or eliminating bacteria; increasing viscosity of the fracturing fluid; preventing corrosion; winterizing the chemicals; modifying and/or maintaining the pH; and others; or any combination thereof.

The subterranean formation is not particularly limited and may include any manmade or naturally occurring geologic formation to which hydraulic fracturing may be applicable. Non-limiting examples of subterranean formations include those which contain or are suspected to contain one or more product such as petroleum, oil, natural gas, brine, geothermal energy, coalbed methane, water, drinking water, steam, helium, soluble minerals, or combination thereof. Other non-limiting examples of subterranean formations include those which are suitable for or suspected to be suitable for waste disposal, sequestration, mining, testing, and the like. The accessibility of the subterranean formation is not limited to "land" operations, and the formation may suitably be found under any of land, water (such as river, lake, ocean, sea, gulf, or the like), ice, permafrost, offshore, onshore, estuarine, or combination thereof.

In some embodiments, the subterranean formation includes one or more of coal, chalk, limestone, dolomite, shale, siltstone, diatomite, tight sands, and the like, or a combination thereof.

While the compositions and methods described herein are particularly applicable for stimulating production from oil and gas wells, they may also be suitably applied in various embodiments to increase the yield of drinking water from wells; to prevent or induce cave-ins during mining operations; to enhance waste remediation or disposal, e.g., of hydrocarbon, aqueous, radiological, or other toxic waste; to dispose waste by injection; to enhance the removal of subterranean waste; to measure geologic stress; to enhance the generation of electricity via geothermal systems; to increase injection rates for sequestration of carbon dioxide and other gases or vapor; or any combination thereof.

In some embodiments, the proppant particle is inorganic, organic, or a combination thereof.

In some embodiments, the proppant particle comprises a coating.

In some embodiments, the proppant particle comprises a crosslinked coating.

In some embodiments, the proppant particle comprises a surface modifier.

In some embodiments, the proppant particle is uncoated.

In some embodiments, the proppant particle is substantially non-deformable.

In some embodiments, the proppant particle has a crush strength of about 2,000 to about 30,000 psi.

In some embodiments, the proppant particle is deformable.

In some embodiments, the composition further comprises one or more different proppant particles.

In some embodiments, the proppant particle has a size of about 70 µm to about 7 mm.

In some embodiments, the proppant particle has a mesh size of 2 to 200.

In some embodiments, the ground rubber tire particle comprises a coating.

In some embodiments, the ground rubber tire particle comprises a crosslinked coating.

In some embodiments, the ground rubber tire particle comprises a surface modifier.

In some embodiments, the ground rubber tire particle is uncoated.

In some embodiments, the composition comprises one or more different ground rubber tire particles.

In some embodiments, the ground rubber tire particle has a size of about 70 µm to about 7 mm.

In some embodiments, the ground rubber tire particle has a mesh size of 2 to 200.

In some embodiments, the composition further comprises a fracking fluid.

In some embodiments, the composition has a temperature dependent weight loss of about 30% or less over a temperature range of about 30 to about 1050° C.

In some embodiments, the method comprises permitting or causing a chemical or physical reaction to occur between a plurality of one or more of the proppant particle, ground rubber tire particle, or a combination thereof.

In some embodiments, proppant particles are used themselves or combined with other traditional proppants in hydraulic fracturing fluid along with other additives which can be transferred to a reservoir to release valuable solids, fluids and gases.

In some embodiments, proppant particles include an inorganic particle combined with an organic component.

In some embodiments, the inorganic particle is one or more of silica, sand, gravel, glass, bauxite, alumina or any other ceramic material, or combination thereof.

In some embodiments, the inorganic particle has been modified to contain functional reactive group on its surface which bind to the organic particle.

In some embodiments, the organic particle has been modified to contain functional groups which help it with binding to modified or unmodified inorganic particles.

In some embodiments, the organic particles react or/and encapsulate the inorganic particles, after or before pump in the ground for oil and gas extraction purpose.

In some embodiments, the organic component is preferably unsaturated hydrocarbon or polymer, capable of chemically binding to inorganic core particle.

In some embodiments, the organic component is derived from a ground rubber tire particle containing carbon black.

In some embodiments, the organic particle is used with or without any inorganic component as a proppant by itself or in combination with other traditional proppants.

In some embodiments, the organic materials are derived from renewable and recycle resources like lignin, chitosan, or cellulose.

In some embodiments, the particle size of the inorganic particle ranges from 2 to 200 mesh size.

In some embodiments, the organic particles are derived from discarded tires waste via cryogenic, ambient method, fine grind-ambient method or cryogenic method.

In some embodiments, the size of organic particles generally ranges from 1-200 mesh size.

In some embodiments, the organic component comprises 2-50% by weight of the total weight of the said proppant particles.

In some embodiments, the proppant particles are further modified via grafting methods such as silylation, halogenation, amination, sulfonation and epoxidation.

In some embodiments, vinyl monomers are used to graft particles and include one or more acrylics, dienes, olefins, styrenics, and any other unsaturated compounds.

In some embodiments, the grafting is carried out with or without any initiator.

While the invention has been described with reference to certain particular examples and embodiments herein, those skilled in the art will appreciate that various examples and embodiments can be combined for the purpose of complying with all relevant patent laws. Any embodiment discussed with respect to one aspect applies to other aspects as well and vice versa. Each embodiment described herein is understood to applicable to all aspects of the invention. It is contemplated that any embodiment discussed herein can be implemented with respect to any method or composition, and vice versa.

What is claimed is:

1. A composition for hydraulic fracking, comprising:
   an inorganic, non-deformable, uncoated proppant particle having a size of about 70 µm to about 7 mm; and
   a ground rubber tire particle comprising a blend of natural rubber and styrene-butadiene-rubber (SBR), wherein the tire particle is surface-grafted with poly acrylic acid.

2. The composition of claim 1, wherein the proppant particle has a crush strength of about 2,000 to about 30,000 psi.

3. The composition of claim 1, further comprising one or more different proppant particles.

4. The composition of claim 1, further comprising one or more different ground rubber tire particles.

5. The composition of claim 1, wherein the ground rubber tire particle has a size of about 70 µm to about 7 mm.

6. The composition of claim 1, wherein the ground rubber tire particle has a mesh size of 2 to 200.

7. The composition of claim 1, further comprising a fracking fluid.

8. The composition of claim 1, which has a temperature dependent weight loss of about 30% or less over a temperature range of about 30 to about 1050° C.

9. A method of treating a subterranean formation, comprising injecting the composition of claim 1 into said subterranean formation.

10. A method of extracting or injecting a product or feed from or into a subterranean formation, comprising:
   injecting the composition of claim 1 into said subterranean formation; and
   thereafter, extracting a product from said subterranean formation, injecting a feed into said subterranean formation, or a combination thereof.

11. A method for making a hydraulic fracking composition, comprising contacting:
   the composition of claim 1; and
   a fracking fluid.

* * * * *